Feb. 28, 1939. C. E. KRAUS 2,148,479
METHOD OF AND MACHINE FOR MILLING
Filed Sept. 24, 1937 6 Sheets-Sheet 1
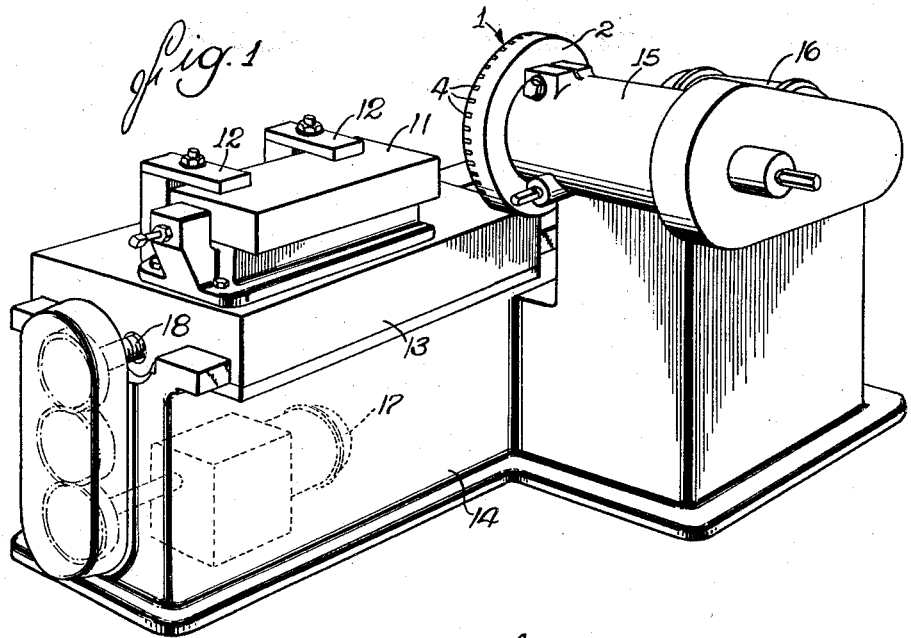
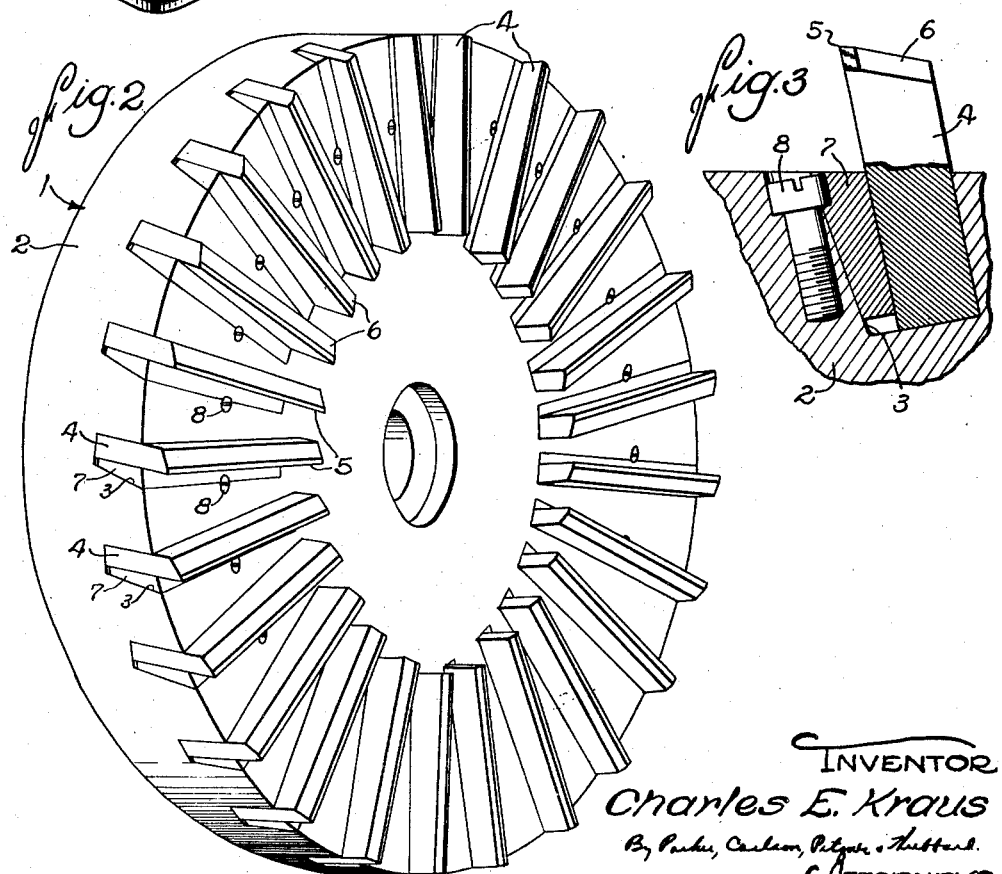
INVENTOR
Charles E. Kraus
ATTORNEYS

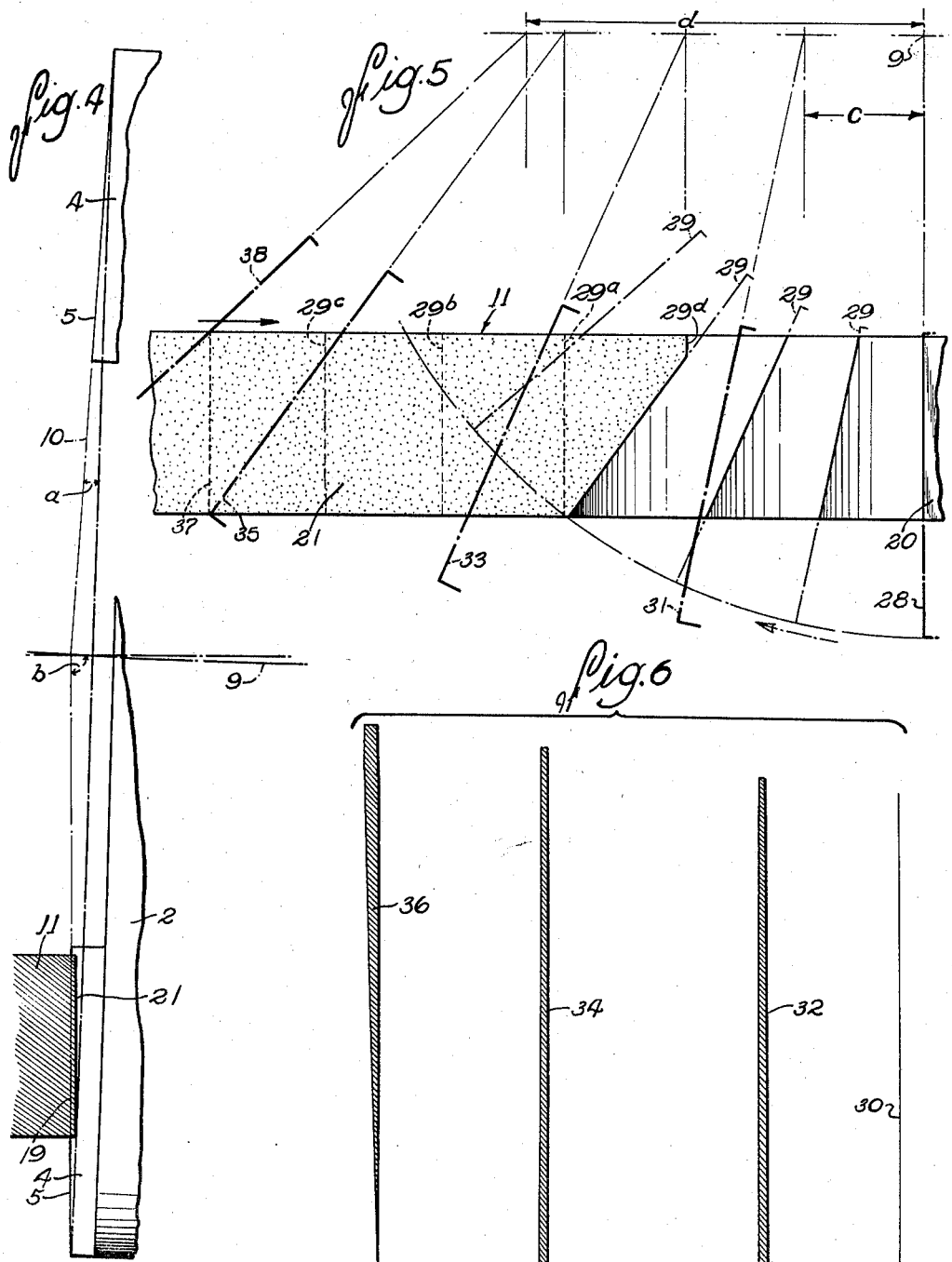

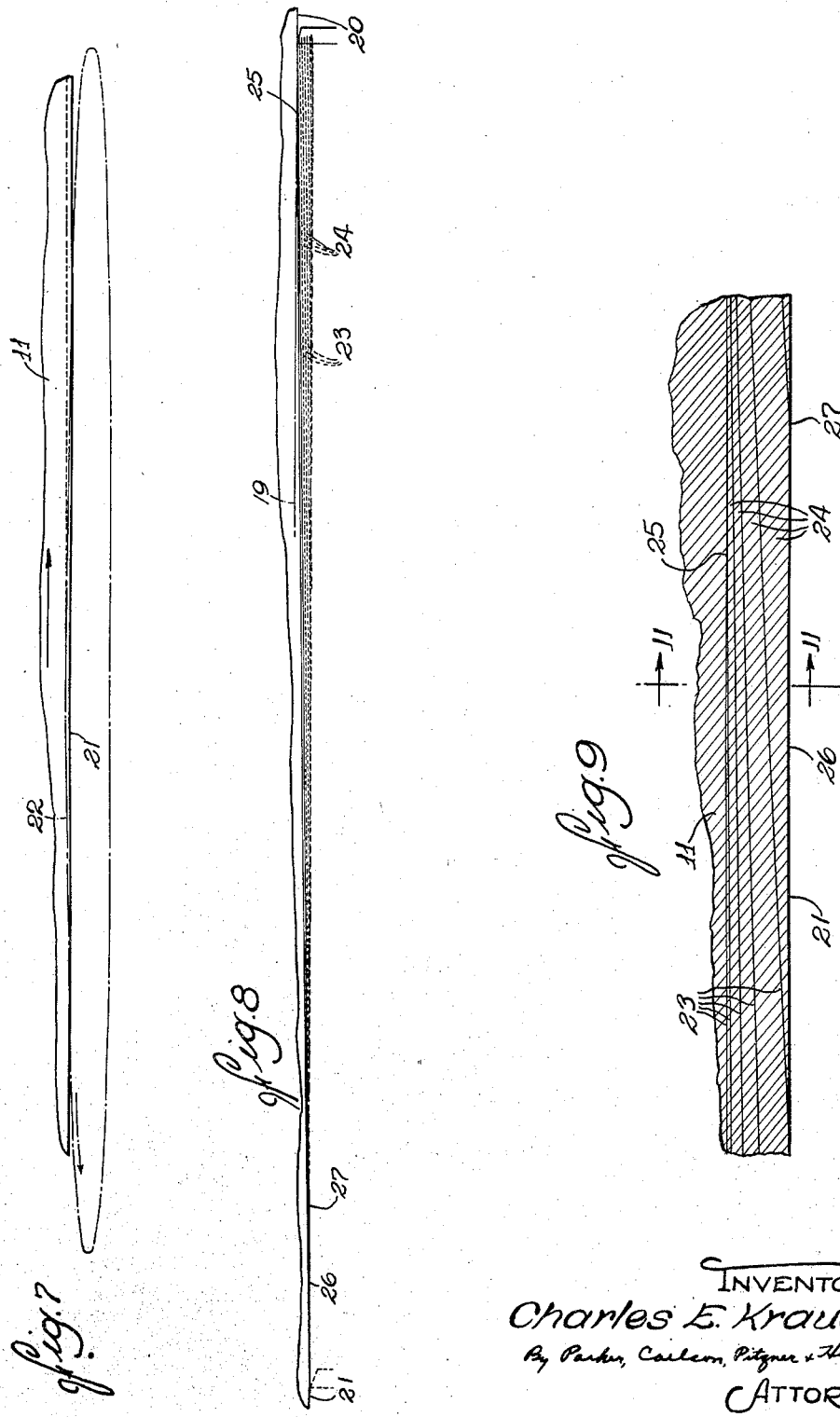

Feb. 28, 1939. C. E. KRAUS 2,148,479
METHOD OF AND MACHINE FOR MILLING
Filed Sept. 24, 1937 6 Sheets-Sheet 4
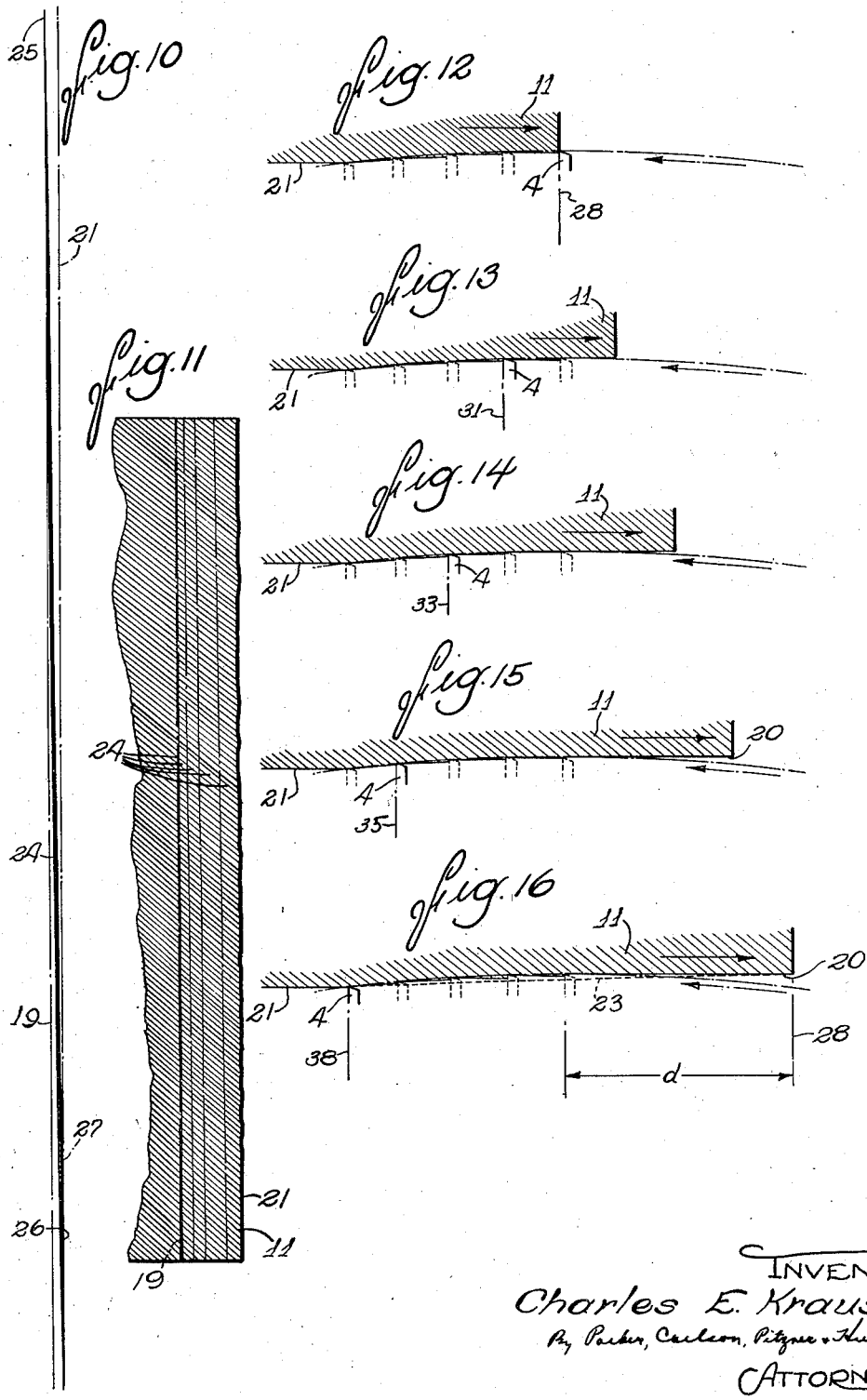

INVENTOR
Charles E. Kraus
By Parker, Carlson, Pitzner & Hubbard
ATTORNEYS

Feb. 28, 1939.   C. E. KRAUS   2,148,479
METHOD OF AND MACHINE FOR MILLING
Filed Sept. 24, 1937   6 Sheets-Sheet 6
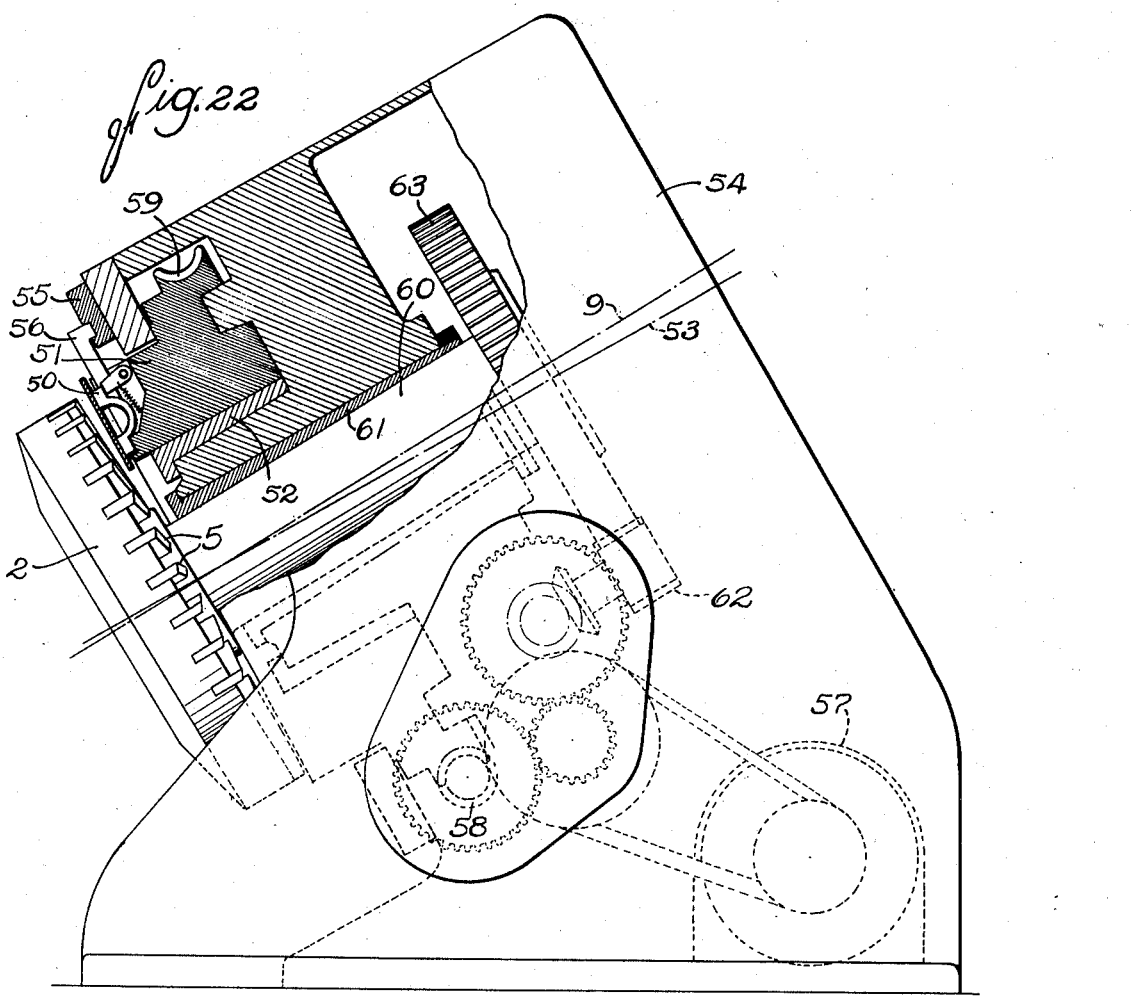
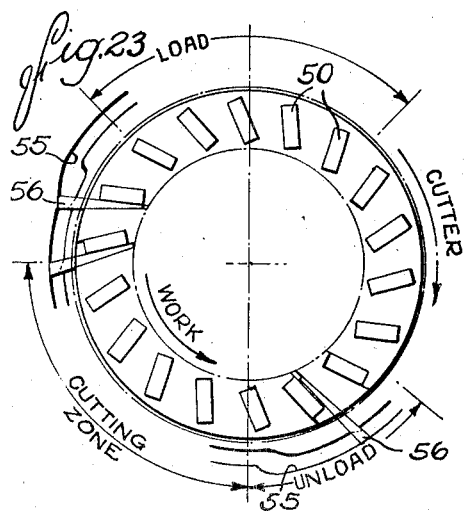
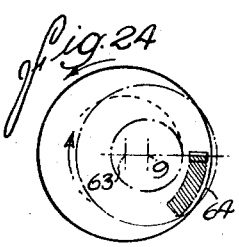
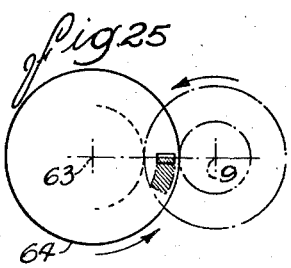
INVENTOR
Charles E. Kraus
By Parker, Carlson, Pitzner & Hubbard
ATTORNEYS Patented Feb. 28, 1939

2,148,479

UNITED STATES PATENT OFFICE 2,148,479

METHOD OF AND MACHINE FOR MILLING

Charles E. Kraus, Rockford, Ill., assignor to The Ingersoll Milling Machine Company, Rockford, Ill., a corporation of Illinois Application September 24, 1937, Serial No. 165,445

28 Claims. (Cl. 90—18)

This invention relates to the milling of work piece surfaces and more particularly to the removal of metal from a work piece with a multiple blade rotary cutter by taking inclined cuts extending between the rough and finished work surfaces generally longitudinally of the direction of relative feed between the cutter and the work.

Cutting action of this general character occurs in the operation of a so-called slab milling cutter in which the blades are arranged on the periphery of a rotatable cylinder. In view of practical limitations imposed upon the size of such cutters, the thickness of the chips removed by the blades during ordinary roughing cuts is not materially less than the increment of feed per cutter tooth. Consequently, the rate at which metal may be removed with this type of cutter is inherently limited.

The general object of the present invention is to provide a novel method and machine by which the rate of metal removal by a cutting action of the above general character may be increased many times as compared to ordinary slab milling practice.

In carrying out this object, the invention provides for movement of the cutter edges through the work generally longitudinally of the direction of feed and in a novel manner such as to effect a substantial elongation of the chips in said direction without exceeding the permissible chip thickness or otherwise burdening the cutting material and at the same time producing a smooth finished surface.

The invention also resides in the novel character of the method and machine which enables an inexpensive and thoroughly practical cutter to be employed and the machine as a whole to be of simple construction.

Other objects and advantages of the invention will become apparent from the following detailed description taken in connection with the accompanying drawings, in which Figure 1 is a perspective view showing the elements of a typical milling machine in which the present invention may be practiced.

Fig. 2 is a perspective view of the cutter.

Fig. 3 is a fragmentary sectional view through one of the cutter blades and its mounting.

Fig. 4 is a fragmentary side view of the cutter showing its relation to a work piece to be operated upon.

Fig. 5 is an elevational view of the work piece illustrating the progress of the cutting edges therethrough.

Fig. 6 illustrates the cross-sectional shape of a chip along the cutting edge in different positions of the latter shown in Fig. 5.

Fig. 7 is a diagrammatic view showing the ellipse of intersection between the cutter surface and the work piece.

Fig. 8 is a diagrammatic view showing the manner in which successive chips are removed from the work piece.

Fig. 9 is an enlarged sectional view taken longitudinally through the work piece.

Fig. 10 shows one of the chips in longitudinal section.

Fig. 11 is a transverse sectional view through the work piece.

Figure 17:
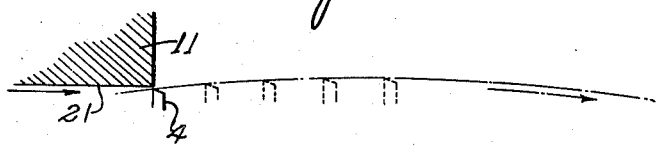
Figure 18:
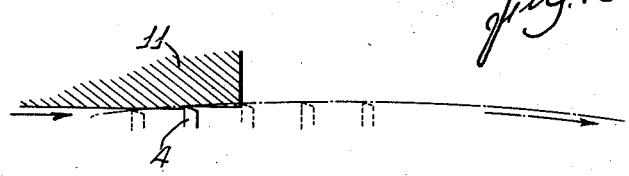
Figure 19:
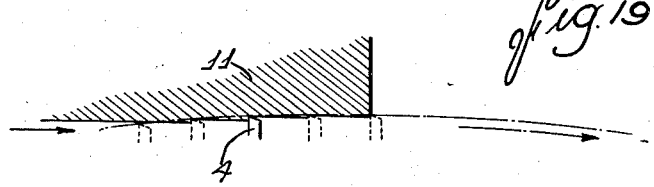
Figure 20:
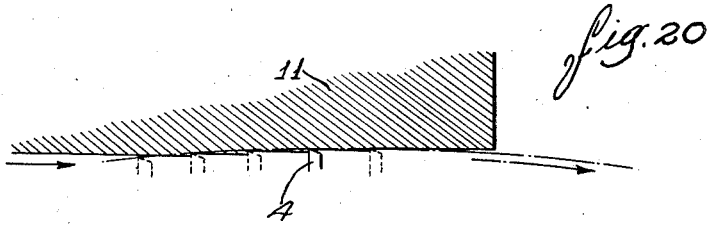

Figs. 12 to 16 inclusive are diagrammatic views illustrating different relative positions of the work and cutter blades during the progress of a cut.

Figs. 17 to 21 are similar views illustrating a modified form of the invention.

Fig. 22 is an elevational view partially in section showing a modified form of milling machine embodying the present invention.

Fig. 23 is a diagrammatic face view of the work table shown in Fig. 22.

Figs. 24 and 25 are diagrammatic views illustrating the paths of movement of the cutter blades and work pieces in modified forms of the invention.

While the invention is susceptible of various modifications and is capable of being practiced in a wide variety of machines, I have shown in the drawings and will describe herein the preferred forms of the invention and typical machines for practicing the same. I do not intend to limit the invention by such exemplary disclosure, but aim to cover all modifications and alternative methods and constructions falling within the spirit and scope of the invention as expressed in the appended claims.

The exemplary method illustrated in the drawings, as applied to the removal of a layer of metal from a work piece to form a plane surface thereon, comprises rotating an annular series of cutting edges lying on a conical frustum having a small slope or effective cone angle and its axis coinciding with the axis of rotation of the blades, positioning the work piece with the plane of the surface to be formed tangent to said frustum and effecting relative bodily feeding movement between the work piece and the rotating blade edges in a direction longitudinally of said plane and transversely of the line of tangency between the plane and the frustum. The cone angle is of such small magnitude that each blade edge, as it cuts broadwise through the work in the general direction of the feeding movement, removes a chip which is as wide as the work and is very long in the feeding direction extending from the finished surface to the rough surface of the work at such a small angle that the chip thickness will be a very small fraction of the increment of feeding movement per cutting edge. Accordingly, the maximum permissible thickness of the chips removed by the individual cutting edges will not be exceeded when cuts of ordinary depth are taken at a feed rate per cutting edge many times, for example, more than ten, as great as the permissible chip thickness.

Referring to Figs. 2 and 3, the cutter indicated generally at 1 comprises a cylindrical body 2 having relatively closely spaced slots 3 in one end or transaxial face extending substantially radially, the particular shear angle being determined by the kind of work material to be milled. The slots are spaced uniformly around the cutter face and receive blades 4 each positioned with one side portion projecting from the body and comprising a block of cutting material having an elongated cutting edge 5 formed along the leading edge of the exposed surface 6 which slopes away from the cutting edge to afford proper clearance. Each blade may, for example, be clamped against the bottom and one side wall of its slot by an inwardly tapering wedge 7 received between the blade and the opposite wall of the slot. The wedge is held in position by a screw 8 threading into the cutter body with its head overlying the wedge.

The cutting edges 5 have a radial length greater than the width of the work piece measured in a direction transverse to the feed, and the blades are mounted with their inner ends spaced a substantial distance outwardly from the axis 9 of rotation of the cutter. Where a plane surface is to be formed on the work piece, flat blade edges will be employed.

As above set forth, the blades are constructed and mounted in the body 2 so that the edges 5 will be inclined at an angle slightly less than a right angle relative to the cutter axis. Thus, as shown in Fig. 4, the edges lie on the frustum of a cone 10 the axis of which coincides with the cutter axis. The edges may, of course, be inclined relative to the radii of the cutter body so as to provide a proper shear angle. The exact cone angle $a$ employed will be influenced by numerous factors including the depth of cut to be taken, the desired rate of feed, the permissible cutting speed, etc. For cuts of ordinary depth, for example, one-eighth of an inch, the angle will range from two to five degrees and will not, even where thicker cuts are to be taken, exceed a maximum of ten degrees.

Various types of machines may be utilized in carrying out the invention with the cutter constructed as above described. In one form shown in Fig. 1, the work piece indicated at 11 is secured by suitable clamps 12 upon a table 13 slidable along ways on a bed 14. The cutter is fast on a spindle journaled in a suitable bearing 15 disposed close to the cutter so as to provide a cutter mounting of proper rigidity. The spindle is driven through speed reduction mechanism by an electric motor 16. Reciprocatory motion may be imparted to the table by an electric motor 17 operating through speed reduction gearing to drive a screw 18 threading into a nut on the table.

Assuming that the cone angle $a$ to be employed is five degrees, the cutter spindle would be mounted with its axis 9 inclined at an eighty-five degree angle $b$ relative to the plane 19 of the finished work surface 20 to be formed. Also, the work would be clamped on the table in a position such that the plane 19 is disposed parallel to the direction of motion of the table and tangent to the periphery of the cone 10 on which the blade edges lie. The work piece is spaced from the cutter axis beyond the orbit described by the inner ends of the blades and, for a reason to appear later, substantially within the orbit of the outer ends of the cutting edges.

With the cutter and work piece thus mounted, it will be apparent that the cutter frustum will intersect a side of the work along a line 22 (Fig. 7) which constitutes the flattest portion of an ellipse whose minor axis is very short as compared to the major axis which equals the diameter of the cutting edges at their outer ends. The ellipse is the projection of the orbit traversed by the outer ends of the cutting edges on a plane perpendicular to the finished work surface and parallel to the direction of feed, the projection of the orbit of the inner ends of the cutting edges on the same plane is a similarly shaped smaller ellipse.

If the work is fed in a rectilinear path substantially along a chord of the circle traversed by the cutting edges as indicated by the arrows in Fig. 7 and in a direction reverse to the arcuate movement of the cutter blades, the successive blade edges will cut through the work along lines 23 (Fig. 8) and generate surfaces corresponding to such lines, effecting removal of metal in layers 24 (Figs. 8, 9, and 11) which are extremely thin and have a length in the direction of feed substantially equal to the effective radii of the cutter added to the feed per tooth. Thus, as illustrated in Fig. 8, each edge enters the work in the plane 19 of the finished surface and emerges from the rough surface 21. The chip 24 (Fig. 10) has a thin feather edge 25 at the point of blade entry and increases in thickness gradually toward the other end which has a flat portion 26 defined by the rough work surface and equal in length to the distance through which the work is fed per tooth of the cutter. It will be observed that the chip extends throughout its length at a very small angle, usually less than ten degrees for roughing operations, to the plane 19 of the finished surface and has a maximum thickness indicated at 27 which is only a small fraction of the indicated feeding movement per cutter tooth.

It will be observed that the effective cutting speed is equal to the sum of the rate of work feed and peripheral speed of the cutter. The ratio of these may vary widely, the latter exceeding the former for most applications in production milling.

The progress of a cutting edge through the work is illustrated in Figs. 5 and 12 to 16, the direction of feed and cutter rotation being indicated by the arrows and it being assumed that the feed rate and peripheral speed of the cutter are substantially equal. Each edge first engages the work in the plane of the finished surface and along a line 28 which, in this instance, is the line of tangency between the finished surface and the conical frustum on which the cutting edges lie (Figs. 5 and 12). At this time, the outermost end portion of the blade edge overhangs the work piece a substantial distance and the preceding blade edges are positioned as indicated at 29 and as shown in dotted outline in Fig. 12. Thus, the three preceding edges are in engagement with the work on the side thereof adjacent the cutter axis, the third edge starting to emerge from the work on the remote side of the latter along a transverse line 29ª. The second and first preceding edges will emerge along lines 29ᵇ and 29ᶜ, the fourth preceding edge having left the work at 29ᵈ. Due to the feeding movement which is along a chord of the cutter face offset from the cutter axis beyond the orbit of the inner ends of the edges, the latter move through the work generally longitudinally of the direction of feed and also progress arcuately across the work.

As the blade starts to cut, the cross section of the chip along the blade edge is shaped as indicated at 30 (Fig. 6). After the work has been fed a distance c which is equal to the feed per cutter tooth, the edge will have advanced to its second position indicated at 31 (Fig. 5) and in full lines in Fig. 13. The cross section of the chip at this point will be approximately uniform across the width of the work and is indicated at 32 (Fig. 6). After a second similar movement of feed, the edge is brought to the position 33 at which the chip has a substantially uniform but longer cross section 34. Near the third similar increment of feed of the work during which the edge reaches a position 35 (Figs. 5 and 15), the outer end portion begins to emerge from the rough surface as will be seen from Fig. 5, the chip cross section at this time tapering as shown at 36. The blade edge continues to emerge from the rough surface along a transverse line 37 the inclination of which will vary slightly according to the rate of feed and the cone angle employed. Final disengagement of the blade from the work occurs on the near side of the work piece with the blade edge positioned at 38.

It will be seen that in cutting through the metal layer to be removed from the work, each blade edge traverses a distance relative to the work equal to the spacing of the lines 28 and 37 in Fig. 5 while the work is being fed a distance d. The line of cutting or zone of engagement with the work will thus diverge very gradually from the finished surface and be disposed at a very small angle to the direction of the feed, not exceeding ten degrees and usually being substantially less when an ordinary roughing cut of one-eighth of an inch is taken. In view of this, the maximum thickness of the chip is a correspondingly small fraction, that is, less than one-tenth, of the increment of feed per cutter tooth, but the volume of metal removed by each cutting edge is high owing to the substantial length of the chip. The latter is substantially greater than the distance between adjacent edges of the cutter or is a substantial proportion, that is, at least one tenth, of the major circumference of the cutting face. Otherwise stated, the chip length in the direction of feed is many times the length of the minor axis of the larger ellipse (Fig. 7) previously referred to. As a result, the rate of feed may be increased to a value many times the maximum permissible thickness of the chip as determined by the cutting material being used and the metal being cut. For example, it has been found in practice that a layer one-eighth of an inch thick may be removed from a cast iron work piece by cutter blades of high speed steel at a feed rate of three-hundred inches per minute, and this without over-burdening the cutting material. This compares with a twelve inch feed rate which would be the maximum ordinarily employed under similar circumstances with a face milling cutter having blades of high speed steel and possibly fourteen inches per minute using a slab type milling cutter of practical size.

The metal slice removed by each cutting edge is elongated substantially in the direction of feed and the rate of metal removal is increased correspondingly in the present instance by employing cutting edges the outer end portions of which overhang or project a substantial distance outwardly beyond the side of the finished work surface remote from the cutter axis when the edges become disposed generally perpendicular to the direction of feed. Thus, as an edge progresses into the work, the zone of engagement between the work and the edge lengthens and the overhanging edge portion enters the work progressively so that the cutting edge is effective over the full width of the work for a substantial distance, that is, to the line 37 where the edge begins to emerge. During such emergence which occurs in the final arcuate movement of the edge across the work, the zone of engagement decreases progressively.

The present method of metal removal possesses numerous other advantages. First, the cutter blades are of simple and inexpensive construction and may be sharpened conveniently by present cutter grinding equipment. Secondly, the method results in the formation of a fine finish so that, for many applications, the necessity of a separate finishing operation is avoided. The improved finish is due to the fact that the cutting edges enter the work while moving in a direction substantially parallel to the finished surface. Furthermore, the cutter is of such construction that the edges may be supported with the rigidity required in order to accurately maintain the proper positions of the edges during starting of the cuts, thereby avoiding the revolution marks inherent with slab type milling cutters.

In work pieces of relatively narrow width, continuous blade edges may be employed. To reduce vibration and break up the chips in machining wide work surfaces, it may, in some instances, be desirable to provide notches in the cutting edges. The notches of the adjacent blades would, of course, be staggered so as to minimize irregularities on the finished surfaces.

The present method lends itself to attainment of even higher rates of feed than those above referred to. To this end, the parts are mounted in the same relation as that described above, but the work is fed in the direction of arcuate movement of the blades but at a substantially greater speed, preferably at least twice the speed of the blades.

Figure 21:
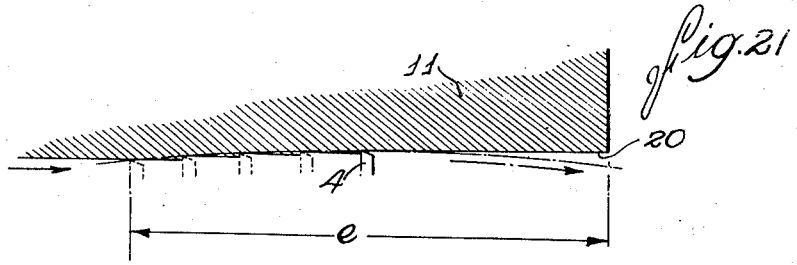

Figs. 17 to 21 which may be compared with Figs. 12 and 16 illustrate the modified cutting action. Thus, each blade edge enters the work on the rough surface 21 as shown in Fig. 17 and then progresses toward the finished surface 20 (Figs. 18 and 20) on which it emerges from the work as indicated in Fig. 21. During engagement of the blade, the work will be advanced a distance e which, it will be observed, is substantially greater than the distance d through which the work is moved during engagement of one blade in the form of the invention first described. In practice, it has been found that feed rates up to 1200 inches per minute are permissible with blades composed of high speed steel. Of course, this modification of the improved method would be used in practice only where production requirements and facilities for handling and loading the work pieces make it possible to utilize a rate of feed greater than that obtainable with the preferred method first described.

The improved method of removing metal is especially adapted for continuous milling so that loss of time due to the necessity of an idle rapid return motion may be avoided. To this end, the work piece may be mounted for feeding movement in a circular path the center of which is substantially concentric with the cutter axis (Figs. 22 and 23), encircling the cutter axis (Fig. 24) or the cutter axis may be disposed outside of the work circle (Fig. 25).

In the exemplary machine shown in Figs. 22 and 23, the work pieces indicated at 50 are received in suitable sockets spaced around the periphery of an inclined face on a table 51 journaled on bearings 52 to turn about an axis 53. The bearings are supported by a rugged frame and housing 54 which carry a suitable cam 55 for actuating devices 56 by which the work is clamped automatically while passing through an arcuate cutting zone and unclamped in the loading and unloading zones. The frame 54 houses an electric motor 57 operating through suitable speed reduction gearing to drive a worm 58 which meshes with a worm wheel 59 formed around the periphery of the table.

The cutter body 2 is fast on the end of a spindle 60 which projects from the face of the cutter and is journaled in a bearing 61 within the housing. Power from the motor is transmitted to a pinion 62 meshing with a gear 63 on the inner end of the cutter shaft. As previously described, the edges of the cutter blades lie on a frustum and have the desired small cone angle. To dispose the plane of the finished work surface tangent to the blade frustum, the cutter axis 9 is inclined at the cone angle relative to the work axis, the two axes intersecting at the apex of the cone as shown in Fig. 22.

With the parts thus mounted, the work pieces 50 and the cutting edges 5 traverse concentric circular paths respectively indicated by the full and dotted lines in Fig. 23. The cutter and work table are rotated in opposite directions. As the work pieces pass through the loading zone (Fig. 23) including the upper part of the work circle, they are spaced from the cutting edges due to tilting of the cutter axis. Engagement between the work and each blade occurs through the cutting zone indicated in Fig. 23. After a blade has passed out of engagement with a work piece, the latter enters the unloading zone and, after being unclamped automatically by the action of the cam 55, is ejected from its supporting socket on the table. Such ejection may be effected by gravity where, as in the machine above described, the unloading zone includes the lower portion of the work circle and the clamping devices when released are adapted to permit the piece to fall from the inclined table.

By mounting the work table and cutter with their axes substantially concentric, the present method is adapted for forming a contoured as well as a plane surface on a work piece, it being observed that the path of the rotating blades extends longitudinally of the direction of feed of the work. Thus, by properly shaping the cutting edges 5, a surface having any desired transverse contour may be produced. This form of invention is also advantageous in that the cutter blades need not be materially longer than the width of the finished work surface.

Where it is desirable to provide more space or to fully expose the work holders for loading and unloading, the cutter may be mounted as shown in Fig. 24 with its axis 9 offset from the work axis 63 but disposed within the circular path 64 traversed by the work pieces. In other respects, the relation of the parts is as described previously. The cutter blades, which travel in the path indicated by the dot-dash lines, would engage the work over the shaded area.

Still another arrangement for continuous milling is illustrated diagrammatically in Fig. 25. In this case, the cutter axis is disposed outside of the work circle so that the blade engages the work over an area indicated by the shading.

The modified arrangements shown in Figs. 22 and 24 possess a further advantage over the others in enabling greater feed rates to be employed. Thus, due to the same or similar curvature of the paths traversed by the cutter blades on one hand and the work pieces on the other, the range of contact between the cutter blades and the work is enlarged substantially. The chips removed are correspondingly lengthened in the direction of feed so that an increased rate of feed may be employed without causing the chips to exceed the allowable thickness.

I claim as my invention:

1. A machine for removing metal from a work piece to form a flat surface thereon comprising, in combination, a power rotated cutter head, a series of cutting edges annularly spaced around an end face of said head and lying on a conical frustum having a cone angle of less than ten degrees and its axis coincident with the rotational axis of said head, means for supporting said work piece with the plane of said surface disposed tangent to said frustum, and power actuated mechanism for bodily feeding said work piece and said rotating head relative to each other in a direction along said plane and transversely of the line of tangency between the plane and said frustum.

2. A machine for removing metal from a work piece to form a flat surface thereon comprising, in combination, a power rotated cutter head, a series of cutting edges annularly spaced around an end face of said head and lying on a shallow conical frustum the axis of which is coincident with the rotational axis of said head, means for supporting said work piece with the plane of said surface disposed tangent to said frustum, and power actuated mechanism for bodily feeding said work piece in a circular path about an axis inclined a few degrees relative to the cutter axis and disposed outside of the circle described by said edges.

3. A machine for removing metal from a work piece to form a flat surface thereon comprising, in combination, a power rotated cutter head, a series of cutting edges annularly spaced around an end face of said head and lying on a shallow conical frustum the axis of which is coincident with the rotational axis of said head, means for supporting said work piece with the plane of said surface disposed tangent to said frustum, and power actuated mechanism for bodily feeding said work piece in a circular path about an axis inclined a few degrees relative to the cutter axis and disposed within the circle described by said edges.

4. A machine for removing metal from a work piece comprising, in combination, a power rotated cutter, a series of cutting edges annularly spaced around an end face of said cutter and lying on a frustum of a shallow cone the axis of which is coincident with the rotational axis of said cutter, means supporting said work piece with the plane of said surface disposed tangent to said frustum, and power actuated mechanism for rotating said work piece in said plane about an axis disposed at a small angle to said cutter axis and intersecting the latter substantially at the apex of said cone whereby to feed the work piece transversely of the line of tangency between the plane and said frustum.

5. A machine for removing metal from a work piece to form a flat surface thereon comprising, in combination, a power rotated cutter head, a series of cutting edges annularly spaced around an end face of said head and lying on a shallow conical frustum the axis of which is coincident with the rotational axis of said head, means supporting said work piece with the plane of said surface disposed tangent to said frustum, and power actuated mechanism for rotating said work piece in said plane to advance the work piece transversely of the line of tangency between the plane and said frustum.

6. A machine for removing metal from a work piece to form a flat surface thereon comprising, in combination, a power actuated cutter head, a series of cutting edges annularly spaced around an end face of said head and lying on a shallow conical frustum the axis of which is coincident with the rotational axis of said head, means supporting said work piece with the plane of said surface disposed tangent to said frustum, and power actuated mechanism for bodily feeding said work piece and said rotating head relative to each other transversely of the line of tangency between the plane and said frustum and in the direction of the movement of the edges during engagement with the work and at a speed substantially greater than that of the edges.

7. The method of removing metal from a work piece to form a flat surface thereon which comprises rotating an annularly spaced series of cutting edges lying on a conical frustum having a cone angle of less than ten degrees, positioning said work piece with the plane of the surface to be formed tangent to said frustum, and effecting relative bodily feeding movement between said work piece and said rotating series of edges in a direction along said plane and transversely of the line of tangency between the plane and the frustum to effect removal of metal slices which extend between the finished and rough work surfaces and are many times as long in the direction of the feed as they are thick.

8. The method of removing metal from a work piece to form a flat surface thereon which comprises rotating an annularly spaced series of cutting edges about an axis inclined a few degrees from a perpendicular to the plane of the finished work surface, positioning said work piece for engagement of said edges between the rough and finished work surfaces along a path disposed outwardly from the orbit described by the inner ends of said edges and effecting relative bodily feeding movement between said work piece and said series of edges longitudinally of said path at a rate such as to effect removal of metal slices each having a length in the direction of the feed more than ten times the maximum thickness of the slice.

9. The method of removing metal from a work piece to form a flat surface thereon which comprises rotating an annularly spaced series of cutting edges lying on a shallow conical frustum the axis of which is coincident with the axis of rotation of the blades, positioning said work piece with the plane of the surface to be formed tangent to said frustum, and effecting relative bodily feeding movement between said work piece and said series of blades in said plane and in a direction of movement of said edges but at a substantially greater speed than the edges.

10. The method of removing metal from a work piece to form a flat surface thereon which comprises rotating an annularly spaced series of cutting edges lying on a shallow conical frustum the axis of which is coincident with the axis of rotation of the blades, positioning said work piece with the plane of the surface to be formed tangent to said frustum, and rotating the work piece in said plane to feed the same in a direction transversely to the line of tangency between the plane and the frustum.

11. The method of removing metal from a work piece to form a flat surface thereon which comprises rotating a series of cutting edges lying on a shallow conical frustum the axis of which is coincident with the axis of rotation of the blades, positioning said work piece with the plane of the surface to be formed disposed tangent to said frustum, and relatively feeding the work piece and said series of edges in said plane and along a circular path of a diameter equal to said edges.

12. The method of removing metal from a work piece to form a flat surface thereon which comprises rotating a series of cutting edges lying on a shallow conical frustum the axis of which is coincident with the axis of rotation of the blades, positioning said work piece with the plane of the surface to be formed disposed tangent to said frustum, and rotating the work piece in said plane about an axis inclined to said first mentioned axis and intersecting the latter substantially at the apex of said frustum.

13. The method of removing metal, which comprises rotating a series of cutting edges through an endless path, causing rapid relative feed between the work and said rotating series of edges along a path so correlated with the path of rotation of said edges that said edges move through the work in a direction generally longitudinal to the direction of feed and through a cutting zone many times longer in the direction of feed than the distance between two adjacent cutting edges, thereby removing overlapping layers of metal which are very long in the direction of feed and very thin in a direction perpendicular to the finished surface.

14. The method of removing a surface layer of metal from a work piece, which comprises rotating through an endless path a series of cutting edges of individual lengths greater than the width of said layer, and causing relative feed between said series of rotating edges and the work piece along a chord-like path disposed at one side of the axis of rotation of said edges and between the orbits defined by the inner and outer ends of said edges, the planes of said orbits being inclined at such a small degree to the plane of the finished surface of the work piece that said cutting edges remain in cutting relation to the work piece through an extended zone and remove from the work very thin long overlapping layers of metal.

15. The method of removing a surface layer of metal from a work piece, which comprises rotating through an endless path a series of cutting edges of lengths greater than the width of said layer, and causing relative feed between said series of rotating edges and a work piece along a path disposed at one side of the axis of rotation of said edges but within the orbital zone of said edges and so correlated with the path of rotation of said edges that said edges move through the work in a direction generally longitudinal to the direction of feed and remain in cutting relation to the work through a distance many times longer in the direction of feed than the distance between two adjacent cutting edges, thereby removing from the work overlapping layers of metal which are very long in the direction of feed and very thin in a direction perpendicular to the finished surface.

16. The method of removing a surface layer of metal from a work piece comprising, relatively feeding the work piece and a series of cutting edges along a predetermined path, and revolving said edges through the work along curved paths extending generally longitudinally of and gradually diverging away from the finished surface, to cut off metal in slices each having a maximum thickness which is a small fraction of the feeding movement per cutting edge and a length in the direction of feed equal at least to one-tenth of the major circumference of the path traversed by the active portions of said edges.

17. The method of removing metal from a work piece to form a flat finished surface thereon comprising revolving a series of cutting edges of lengths greater than the width of said surface and lying on a conical frustum of such angle that the projection of the orbit defined by the outer ends of said edges onto a plane perpendicular to an element of the frustum is an ellipse having a major axis many times as long as its minor axis, and effecting relative bodily feeding movement between said work piece and said revolving edges along a path perpendicular to said element and spaced from the axis of revolution so that the outer end portion of each edge projects beyond the finished work surface and moves progressively into the work.

18. The method of surface milling a work piece which comprises causing a continuous feeding movement between the work and an annular series of cutting edges along the final surface to be formed, and during such movement, revolving said edges through the work along arcuate paths extending generally longitudinally of and laterally across the line of feed and diverging gradually from the finished surface along the line of feed, so that the line of engagement between the work and each edge increases in length as the edge progresses into the work and decreases as the edge emerges therefrom.

19. The method of surface milling a work piece which comprises causing a continuous feeding movement along the final surface to be formed between the work and an annular series of cutting edges defining a convex end cutting face, and during such movements revolving said edges about an axis intersecting the plane of said final surface at a large angle to move each edge through the work and thereby generate a surface on the work, gradually diverging away from said final surface at such a small angle that the metal slice removed by such edge has a length in the direction of said feeding movement more than ten times the maximum thickness of the slice.

20. A milling machine comprising, in combination, a series of cutting edges arranged in the frustum of a very flat cone, means for supporting a work piece with the plane of the surface to be finished tangential to such frustum, so that the orbit defined by the outer ends of said edges when projected onto a plane which extends perpendicular to the plane of the finished surface in the direction of feed will be an ellipse whose major axis is more than five times that of its minor axis, means for rotating said series of edges, and means for causing relative feed between the work piece and the rotating series of edges at such a rapid rate that the cutting path of each edge through the work piece, between the respective planes of the rough and finished surfaces, will diverge very slowly from the finished surface and will be more than twice the length of the minor axis of said ellipse.

21. A milling machine comprising, in combination, a series of cutting edges lying on a conical frustum, means for revolving said edges on the axis of said frustum, means for supporting a work piece with the plane of the finished surface tangential to such frustum, the cone angle of said frustum being not more than six degrees whereby the orbit defined by the outer ends of said edges when projected onto a plane which extends perpendicular to the plane of the finished surface in the direction of feed will be an ellipse whose major axis is more than ten times that of its minor axis, and means for causing relative feed between the work piece and the series of revolving edges at such a rapid rate that the slice of metal removed by each edge between the respective planes of the rough and finished surfaces will have a length in the direction of feed at least four times the length of the minor axis of said ellipse.

22. A milling machine having, in combination, a cutter head having an annular series of cutting edges on one end face thereof disposed on the frustum of a shallow cone, means for rotating said head on the axis of said cone, a rotary support for supporting a work piece with the plane of the finished surface tangent to said frustum and for rotation of the work piece in a circular path of larger diameter than that of said edges, the rotational axis of said support being offset laterally in said plane from said cone axis and disposed within the maximum circumference of said edges whereby the work pieces on said support are carried outwardly beyond the outer periphery of said cutter head in the rotation of said support, and mechanism for rotating said support to feed the work pieces thereon through a zone of engagement with the cutting face defined by said edges.

23. A machine tool for removing metal from a work piece to form a flat surface thereon comprising, in combination, a work support, a tool support, power actuated mechanism for feeding said supports relative to each other along a predetermined path, a power rotated cutter head on said tool support, and an annular series of elongated cutting edges on said head defining a transaxial cutting face, the outer and inner peripheries of which define shallow ellipses when projected on a plane perpendicular to the finished work surface and parallel to the direction of feed, said edges moving broadwise through the work piece in arcuate paths extending generally longitudinally of the direction of feed and each edge removing a slice of metal having a length in said direction of feed greater than the distance between two adjacent cutting edges.

24. A machine tool for removing metal from a work piece to form a finished surface thereon comprising, in combination, a work support, a tool support, power actuated mechanism for feeding said supports relative to each other along a predetermined path, a cutter head on said tool support rotated about an axis offset from the finished work surface and projecting toward the plane thereof, and a multiplicity of elongated cutting edges angularly spaced around an end face of said head and each movable through the work generally longitudinally of the direction of feed along a cutting path longer than one-tenth of the maximum circumference of said cutting face and gradually diverging from the finished work surface so as to remove metal in slices the maximum thickness of which is only a small fraction of the feeding movement per cutting edge.

25. A machine tool for removing metal from a work piece to form a finished surface thereon comprising, in combination, a work support, a tool support, power actuated mechanism for feeding said supports relative to each other along a predetermined path, a power rotated cutter head on said tool support, and an annular series of elongated cutting edges on said head defining a transaxial cutting face and movable broadwise through the work in arcuate paths extending generally longitudinally of the direction of feed between the rough and finished work surfaces, the outer end portion of each edge projecting beyond the zone of initial engagement with the work and then moving progressively into and through the work, whereby to elongate the slice of metal removed by the edge.

26. A machine tool for removing metal from a work piece to form a surface thereon comprising, in combination, a work support, a tool support, power actuated mechanism for feeding said supports relative to each other along a predetermined path, a power rotated cutter head on said tool support, and an annular series of elongated cutting edges on said head defining a transaxial cutting face and movable broadwise through a zone of the work having a length in the direction of feed at least equal to one-tenth of the circumference of said cutting face and diverging away from a line of tangency with the finished work surface so that the maximum thickness of each slice of metal removed is only a small fraction of the feeding movement per cutting edge.

27. A machine tool for removing metal from a work piece to form a flat finished surface thereon comprising, in combination, a work support, a cutter head power rotated about an axis inclined only slightly away from a perpendicular to the plane of the finished surface of a work piece mounted on said work support, a series of cutting edges of lengths substantially greater than the width of said finished surface angularly spaced around an end face of said head so as to revolve in a shallow conical frustum, and power actuated mechanism for relatively feeding said work support and said head along a path offset from said axis to bring said work piece within the cutting range of said edges but spaced inwardly from the outer ends thereof, each of said edges engaging the work along a tangent of said frustum and progressing generally longitudinally of the direction of feed through a zone extending entirely across the work surface for a substantial distance and then arcuately across the direction of feed.

28. A milling machine comprising, in combination, a cutter head having an annular series of blades on one end face thereof, cutting edges on said blades disposed on the frustum of a very shallow cone, means for supporting a work piece with the plane of the surface to be finished tangential to said frustum, each of said edges, when in the line of tangency, extending at least to the side of said finished surface remote from the cutter axis, additional cutting edge portions on said blades each projecting beyond the corresponding first mentioned edge and beyond the said remote side of the finished surface when such edge is in said line of tangency, means for rotating said cutter head on the axis of said frustum during relative feeding movement between said head and work piece to cause said first mentioned edges to move through the work from said line of tangency generally longitudinally of and arcuately across the path of feed and also to cause said projecting edge portions to move progressively into cutting engagement with and arcuately across the work, and means for causing relative feed between the work piece and the rotating cutter head at such a rapid rate that the zone of cutting engagement between the work and said edges and edge portions, between the respective planes of the rough and finished surfaces, will be very substantially extended in the direction of feed thereby removing from the work overlapping layers of metal which are very long in the direction of feed and very thin in a direction perpendicular to the finished surface.

CHARLES E. KRAUS.